US006812585B2

(12) United States Patent
Renner

(10) Patent No.: US 6,812,585 B2
(45) Date of Patent: Nov. 2, 2004

(54) FUEL CUTOFF SYSTEM FOR ENGINE-DRIVEN GENERATOR

(75) Inventor: Ross Renner, Black Creek, WI (US)

(73) Assignee: Illinois Tool Works Inc., Glenview, IL (US)

( * ) Notice: Subject to any disclaimer, the term of this patent is extended or adjusted under 35 U.S.C. 154(b) by 164 days.

(21) Appl. No.: 10/315,684

(22) Filed: Dec. 10, 2002

(65) Prior Publication Data

US 2004/0108728 A1 Jun. 10, 2004

(51) Int. Cl.[7] .................................................. H02P 9/04

(52) U.S. Cl. ....................... 290/41; 290/40 C; 219/133; 123/406.14; 322/90

(58) Field of Search ................................ 290/41, 40 C; 219/133; 123/406.14; 322/90

(56) References Cited

U.S. PATENT DOCUMENTS 4,314,195 A * 2/1982 Muter ......................... 322/90
4,633,831 A 1/1987 Ohkumo ..................... 123/325
5,388,560 A * 2/1995 Hisaki et al. .......... 123/406.14
5,444,214 A * 8/1995 Crouse et al. .............. 219/133
5,467,008 A * 11/1995 Uchinami .................... 322/27
5,584,275 A * 12/1996 Taruya .................. 123/406.14
5,591,362 A 1/1997 Feldhausen et al. ........ 219/133
5,703,410 A * 12/1997 Maekawa ................. 290/40 C
5,734,147 A 3/1998 Bunker et al. ......... 219/130.33
5,814,788 A 9/1998 Everhart et al. ............ 219/133
6,153,855 A 11/2000 Renner et al. .............. 219/133
6,166,525 A 12/2000 Crook ......................... 322/11
6,325,142 B1 12/2001 Bosley et al. ................. 166/53
6,415,769 B1 * 7/2002 Fisher et al. ................ 123/486

* cited by examiner

*Primary Examiner*—Nicholas Ponomarenko
(74) *Attorney, Agent, or Firm*—Ostrager Chong Flaherty & Broitman P.C.

(57) ABSTRACT

Methods and systems for cutting off the supply of fuel to an engine in response to engine turn-off. A fuel cutoff solenoid or functionally equivalent device is connected to a source of electrical power in response to detection of conditions representing engine turn-off. One method for cutting off the supply of fuel to the engine comprises the following steps: detecting whether ignition pulses are present; and then activating a device for cutting off the supply of fuel to the engine in response to detecting the cessation of ignition pulses. The fuel cutoff device is activated by connecting it to either a battery or an output of a generator being driven by the engine. In the latter case, the rotor is grounded and a bipolar transistor is bypassed in response to detection of conditions representing engine turn-off.

24 Claims, 5 Drawing Sheets

FUEL CUTOFF SYSTEM FOR ENGINE-DRIVEN GENERATOR

BACKGROUND OF THE INVENTION

This invention generally relates to engine-driven power supplies. More specifically, the invention relates to systems for controlling the supply of fuel to engines that drive power supplies.

Engine driven welding power supplies are well known, and may be driven either by a DC generator or an AC generator (also called an alternator-rectifier). An AC generator generally includes, in addition to an alternator, a reactor followed by rectifiers to provide a DC output. Electrical power produced by the generator as the engine drives rotation of the rotor is converted by known electrical components into useable welding power available at terminals.

Often, the output is controlled in welding power supplies using feedback. For example, a known field current control algorithm includes the steps of comparing field current to a set point and then adjusting the field current in response to deviations therefrom. Another prior art design receives welding current and/or welding voltage feedback, and controls the field current to produce a desired output. U.S. Pat. No. 5,734,147, issued Mar. 31, 1998 to the assignee of the present invention, and entitled Method and Apparatus for Electronically Controlling the Output of a Generator Driven Welding Power Supply, describes such a field current control. Another example of a known engine driven welding power supply with field current control can be operated to provide a constant current or constant voltage output.

Engine-driven welding power supplies of the foregoing type comprise a generator driven by an engine. Typically the engine is an internal combustion engine that burns gasoline. The engine is started either electrically (using a battery) or manually (by pulling a pull-start cable). Initially the engine may run at an idle speed, with the speed being increased to a running speed when a load is applied to the generator. For example, in one known system, the position of the governor arm of the engine can be changed by energizing a so-called "idle solenoid", which is mechanically linked to the engine governor arm. The state of the idle solenoid is in turn controlled by a suitable idle control circuit that is part of the control system. The idle control circuit, in conjunction with other electrical components, senses the demand for welding power at the welding terminals and actuates the idle solenoid accordingly. During times when welding is taking place, the idle solenoid is de-energized. In the de-energized state, the plunger of the solenoid is free to float, and it does so as the governor arm changes its position to maintain a constant engine operating speed (e.g., 3,700 rpm). When the idle control circuit senses no demand for welding power at the terminals, it starts a delay routine. If after a predetermined period of time, no welding demand has been made, the idle control circuit actuates the solenoid, causing its plunger to retract. When the actuated solenoid clamps the governor arm, the engine speed drops to an idle speed (e.g., 2,200 rpm). However, the engine speed may be controlled in accordance with other control algorithms.

To turn off the welding machine, the engine must be turned off. In the case of an electric-start engine, the engine can be turned off by returning a start or ignition switch to its OFF position. In the case of a pull-start engine, the engine can be turned off by pressing a kill switch. In either case, it is desirable to cut off the supply of fuel in order to decrease fuel consumption and also to avoid after-bang in the muffler, caused when fuel passes through the engine cylinder(s) without being combusted and instead is combusted in the muffler. This circumstance arises when the engine receives fuel but does not receive ignition pulses.

A known device for cutting off the supply of fuel to a turned-off engine is a so-called "fuel cutoff solenoid". U.S. Pat. No. 4,633,831 discloses a fuel cutoff system for a motor vehicle in which a control circuit activates a fuel cutoff solenoid in response to detection of a set of predetermined conditions. The fuel cutoff solenoid is adapted to operate a fuel cutoff valve placed in the fuel line that runs from the fuel tank to the engine. U.S. Pat. No. 6,166,525 discloses an automatic electric power generator control wherein the engine driving the generator stops at a predetermined time after the power demand is removed. In addition, a kill switch is provided to stop the engine. The '525 Patent states that in the simplest case, the kill switch can be a switch or relay connected across the coil primary of the engine, thereby shorting the coil and eliminating the ignition spark; and further states that engines may also be stopped by a fuel shutoff solenoid valve, or a combination of the two methods.

There is a need for fuel shutdown systems and methods that cut off the supply of fuel when the engine of an engine-driven electric generator is turned off. Such systems are needed for both electric-start and pull-start internal combustion engines.

BRIEF DESCRIPTION OF THE INVENTION

The invention is directed to methods and systems for cutting off the supply of fuel to an engine in response to engine turn-off. The invention is particularly directed to methods and systems wherein a fuel cutoff solenoid or functionally equivalent device is connected to a source of electrical power in response to detection of conditions representing engine turn-off.

One aspect of the invention is a method for cutting off the supply of fuel to an engine, comprising the steps of detecting whether ignition pulses are present; and activating a device for cutting off the supply of fuel to the engine in response to detection of a change from a first state in which ignition pulses are present to a second state in which ignition pulses are absent. The device may be activated by drawing electrical power from a battery or from a stator winding in an electric generator being driven by the engine.

Another aspect of the invention is a system for cutting off the supply of fuel to an engine, comprising: a battery power supply; a first device that cuts off the supply of fuel to the engine when energized by the battery power supply and does not cut off the supply of fuel to the engine when not energized by the battery power supply; a second device for connecting the first device to the battery power supply in a first state and disconnecting the first device from the battery power supply in a second state; and a control circuit that causes a change of state of the second device from the second state to the first state in response to a change from ignition pulses being present to ignition pulses being absent. In one disclosed embodiment, the first device is a solenoid and the second device is a relay.

A further aspect of the invention is a method for cutting off the supply of fuel to an engine being used to drive an electric generator, comprising the following steps: detecting whether ignition pulses are present; and coupling a rotor winding of the generator to ground and a stator winding of the generator to a fuel cutoff device in response to detection of cessation of ignition pulses.

Another aspect of the invention is a power generation system comprising: an engine, an engine ignition controller for providing ignition pulses to the engine, a stator winding or coil for providing a generator output, a rotor winding driven to rotate by the engine, and a fuel shutdown system for cutting off the supply of fuel to the engine. The fuel shutdown system comprises: a first device that cuts off the supply of fuel to the engine when energized by the battery power supply and does not cut off the supply of fuel to the engine when not energized by the battery power supply; a second device having first and second states, the rotor winding being connected to ground when the second device is in its first state and not connected to ground when the second device is in its second state; a third device having first and second states, the stator winding or coil being connected to the first device when the third device is in its first state and not connected to the first device when the third device is in its second state; and a control circuit that causes a first change of state of the second device from its second state to its first state and a second change of state of the third device from its second state to its first state in response to cessation of ignition pulses. In one disclosed embodiment, the first device is a solenoid and the second and third devices are relays.

Yet another aspect of the invention is a method for cutting off the supply of fuel to an engine being used to drive an electric generator, comprising the following steps: detecting whether the engine has been turned off; and connecting an input of fuel cutoff device to an output of a stator winding of the generator in response to detection of engine turn-off, the fuel cutoff device being energized by the generator output.

Other aspects of the invention are disclosed and claimed below.

BRIEF DESCRIPTION OF THE DRAWINGS

Reference will now be made to the drawings in which similar elements in different drawings bear the same reference numerals.

DETAILED DESCRIPTION OF THE INVENTION

While the present invention will be illustrated with reference to a particular engine/generator-driven welding power supply, it should be understood at the outset that the invention in its broadest scope may be applied to any engine, including engines that drive other types of electrical generators, e.g., generators not used in conjunction with or incorporated in a welding machine.

The present invention is described with respect to an engine-driven generator welding power supply having an electronic field current controller. The details of the electronic field current controller, as it relates to the welding output (current, voltage and/or power), will not be described herein, but are described in detail in U.S. Pat. No. 5,734,147. (As used herein, the term "electronic controller" refers to a controller using digital, analog, or a combination of digital and analog components.)

Figure 1:
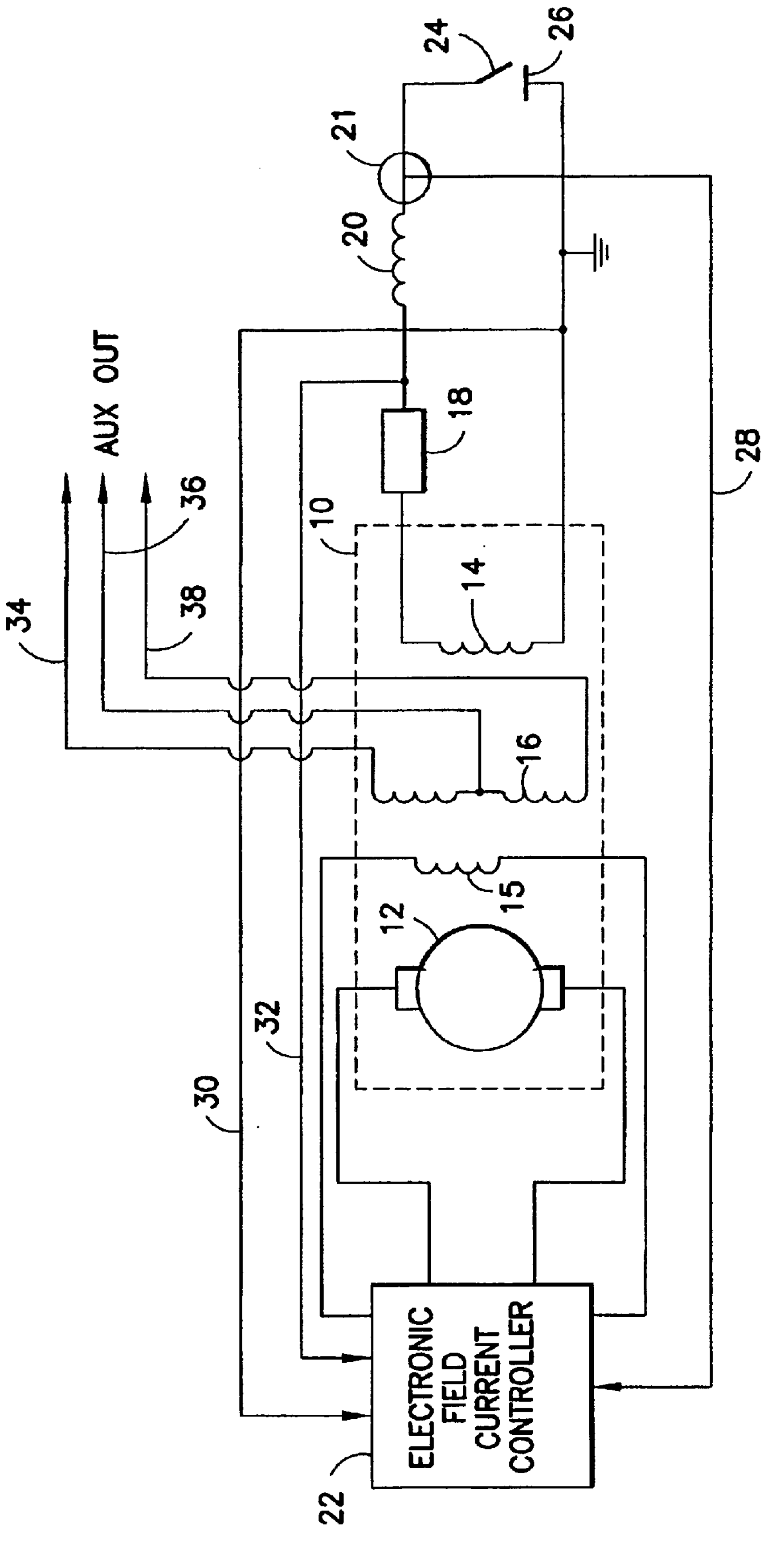
FIG. 1 PRIOR ART
FIG. 1 is a diagram of a known engine-driven welding power supply.

Referring to FIG. 1, the operation of an AC generator-driven power supply having an electronic field current controller will be generally described. The system comprises a generator 10, an electronic field current controller board 22 for regulating the welding and auxiliary outputs of the generator 10, an output rectifier 18, an output inductor or filter 20, weld feedback lines 30 and 32, and auxiliary output lines 34, 36 and 38. The generator comprises a rotor 12 and a stator. The rotor 12 comprises a rotor winding (not shown in FIG. 1) The stator comprises various windings depicted in FIG. 1, including welding power output winding 14, exciter winding 15 and auxiliary power output windings 16. The welding power output winding provides current to one electrode 24 (typically located at the tip of a welding gun). Another electrode 26 is clamped to the workpiece. The electrode 26 is typically connected to machine ground. The winding 14 produces a desired voltage potential difference across the electrodes 24 and 26.

The generator 10 may be either a three-phase or a single-phase generator. In response to current from the field current controller board 22, the rotor winding creates electromagnetic fields that induce current in the various stator windings. The voltage and current derived by welding power output winding 14 is responsive to the magnitude of the field current provided to the rotor 12. The output of welding power output winding 14 is provided to a rectifier 18 and an output inductor 20, which provides the welding power supply to the electrode 24. The magnitude of the field current in the rotor winding is responsive to the electronic field current controller on board 22. Thus, the electronic field current controller indirectly controls the output of welding power supply.

Typically, feedback from the welding output is provided on lines 28, 30 and 32. Voltage feedback is obtained from the output of rectifier 18 and is fed back to the electronic field current controller board 22 via lines 30 and 32. Current feedback is obtained by a current sense device 21 and is fed back to the electronic field current controller board 22 via line 28. The electronic field current controller board 22 uses the current and voltage feedback to control the field current in such a manner as to provide a desired output current and voltage. The exciter winding 15 provides an output to the field current controller, which in turn provides field current to the rotor winding.

The electronic field current controller comprises a frequency-to-voltage converter, a welding voltage regulator, a welding current regulator, a curve shaping circuit, a set point adjust, a welding decoupling circuit, and a pulse width modulator circuit (individually and collectively a welding regulator). The welding voltage regulator receives inputs indicative of welding current and voltage. (Welding current, welding output, welding power and welding voltage refer to the main output of the power supply, which is used for welding in the preferred embodiment. However, in other embodiments the main output of the power supply is used for other purposes, such as plasma cutting, or other high power loads.) Using these inputs, the welding voltage regulator controls the field current and sets the open circuit output voltage of the power supply to a preselected value.

Generally, the auxiliary output windings 16 are used to provide an auxiliary power output (current, voltage and/or power). The auxiliary output is often used to power tools, lights, etc., that require 110 VAC. Thus, the auxiliary output is typically 110 VAC, but may be 240 or 480 VAC. The output may be single phase or three phase. The frequency of the auxiliary output may be made dependent upon the presence or absence a welding output. For example, when a welding output is being provided, the generator runs at a higher rpm, and the auxiliary output will be at approximately 100 Hz. However, when only an auxiliary output is being provided, the generator runs at an idle rpm, and the auxiliary output will be at approximately 60 Hz.

In accordance with the embodiments disclosed herein, the electronic field current controller board comprises a power switch that is turned on and off, as desired, to respectively provide or not provide field current to the rotor. In the respective embodiments shown in FIGS. 2 and 4, the power switch takes the form of an insulated gate bipolar transistor (IGBT) 40. The control board 22 actively controls the output of the generator 10 by switching the IGBT 40 on and off to control the current in the winding of rotor 12. The field current control board 22 regulates the amount of current supplied to the rotor 12. During normal operation, when the IGBT 40 (power switch) turns on, current flows from the field current control board 22 to the rotor 12, and then back to the control board 22 to machine ground via the IGBT 40. The field current control board 22 supplies the current to the rotor 12 from on-board capacitors. These capacitors in turn store electrical energy received via lines connected to the terminals of the exciter winding (item 15 in FIG. 1) in the generator 10. The supply of power to the control board from the exciter winding is generally indicated by the line 23 in FIGS. 2 and 4. The electronics on the control board 22 are powered by electrical energy received via lines connected to the terminals of a lamp coil (not shown) inside the engine 8. The supply of power to the control board from the lamp coil in the engine 8 is generally indicated by the line 23 in FIG. 4, As previously noted, the control board 22 actively controls the output of the generator 10 by switching the IGBT 40 on and off to control the current in the rotor 12. When the power supply to the field current control board 22 is turned off, e.g., by moving an ignition switch to the OFF position when an electric-start engine drives the generator or by pressing a kill switch when a pull-start engine drives the generator, the IGBT (power switch) 40 is also turned off, which turns off the output of the generator 10 as well (by cutting off current to the rotor winding). When the ignition switch is turned off, the engine coasts down and the voltage output by the lamp coil in the engine decreases. The lamp coil output voltage supplies the field current control board with power, which in turn provides the regulated voltage that is applied to the gate of the IGBT 40. The regulated voltage drops as the lamp coil voltage decays. The control board 22 needs to turn the IGBT 40 off when the voltage on the gate of the IGBT is less than 12 volts. This is needed to protect the IGBT from damage.

When the generator is turned off, the fuel to the engine must be cut off to prevent raw gas from entering the muffler, which if it does, will ignite and send a flame out of the muffler accompanied by a substantial after-bang. Different fuel shutdown systems are disclosed herein for respective use with an electric-start engine and a pull-start engine. The former has a battery that can provide the needed power for actuating a fuel cutoff solenoid; the latter does not have a battery, so that the power for actuating the fuel cutoff solenoid is derived from the generator. The first embodiment (electric start) will be described with reference to FIGS. 2 and 3; the second embodiment (pull start) will be described with reference to FIGS. 4 and 5.

Figure 2:
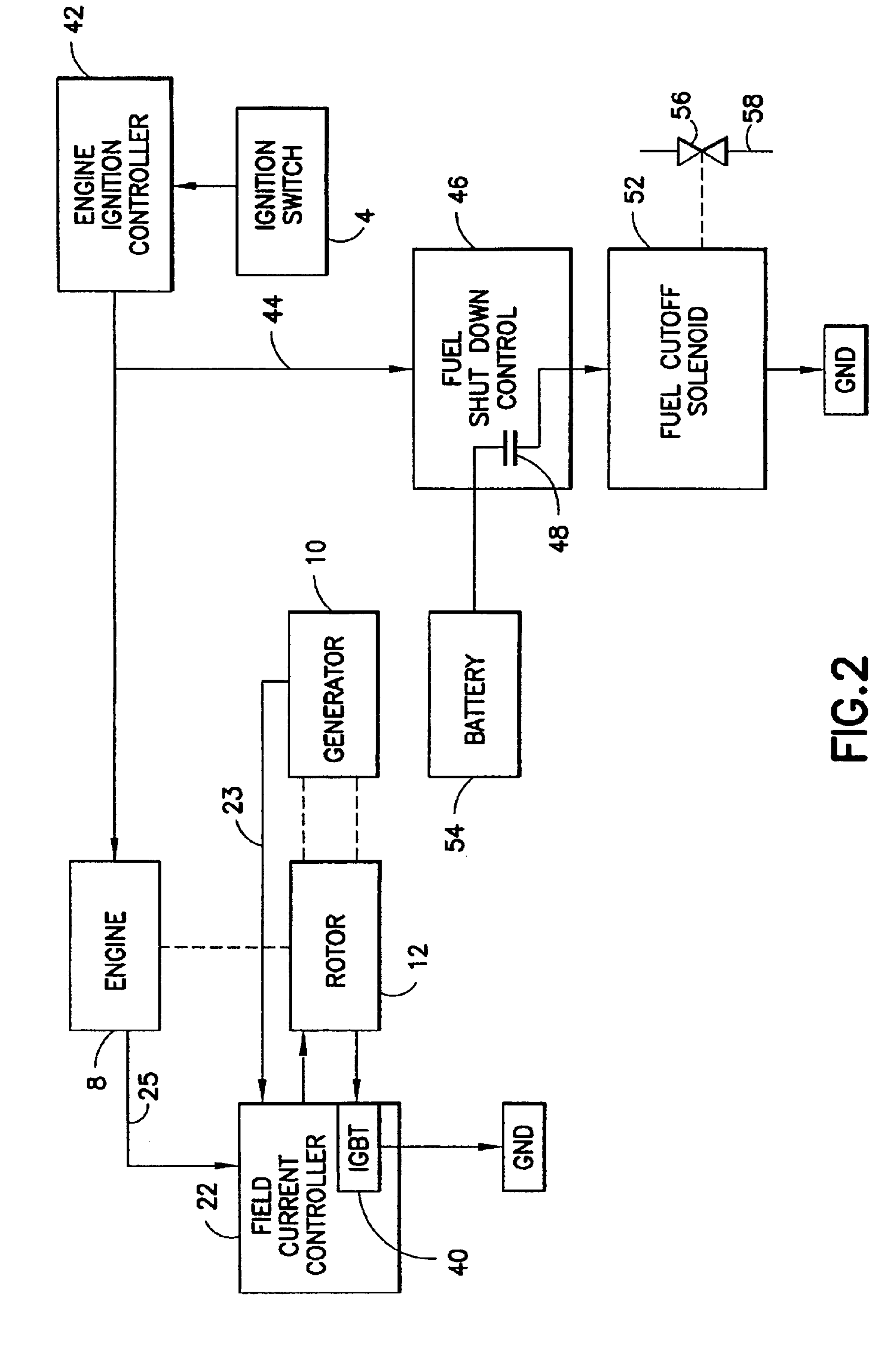
FIG. 2 is a block diagram showing portions of an electric-start engine-driven generator system having a fuel shutdown control system in accordance with one embodiment of the present invention.

In the electric start embodiment depicted in FIG. 2, the battery 54 is used to energize the fuel cutoff solenoid 52, which in turn closes a fuel cutoff valve 56 placed along the fuel line 58 that supplies fuel from a fuel tank (not shown) to the engine 8. Actuation of the solenoid 52 is controlled by a fuel shutdown control board 46 having a relay 48. One side of the relay 48 is connected to the battery 54, while the other side of the relay 48 is connected to the solenoid 52. The fuel shutdown control circuit on board 46 closes the relay 48 in response to the detection of conditions representing engine turn-off. When the ignition switch 4 is in its ON position, the engine ignition controller 42 provides ignition pulses to the engine 8. Ignition pulse signals are also received by the fuel shutdown control board 46 on line 44. In response to detecting that ignition pulses are not present; the fuel shutdown control board 46 activates the fuel cutoff solenoid 52, thereby cutting off the supply of fuel to the engine 8.

The circuitry for performing the fuel shutdown control function may be analog or digital. In one example of an analog circuit, comparators are used to control the ON state of a fuel cutoff transistor as a function of the incoming pulses on line 44. As long as ignition pulses are present, the fuel cutoff transistor is maintained in the ON state. The state of the relay 48 is a function of the state of the fuel cutoff transistor. When the fuel cutoff transistor is ON, the relay is held open. When ignition pulses are no longer present, the transistor turns OFF, causing the relay 48 to close, thereby energizing the fuel cutoff solenoid 52. Alternatively, the fuel shutdown control board could be provided with a microprocessor or a microcontroller that is programmed to issue a command that causes the relay 48 to be closed in response to detection of the above-described condition on line 44.

Figure 3:
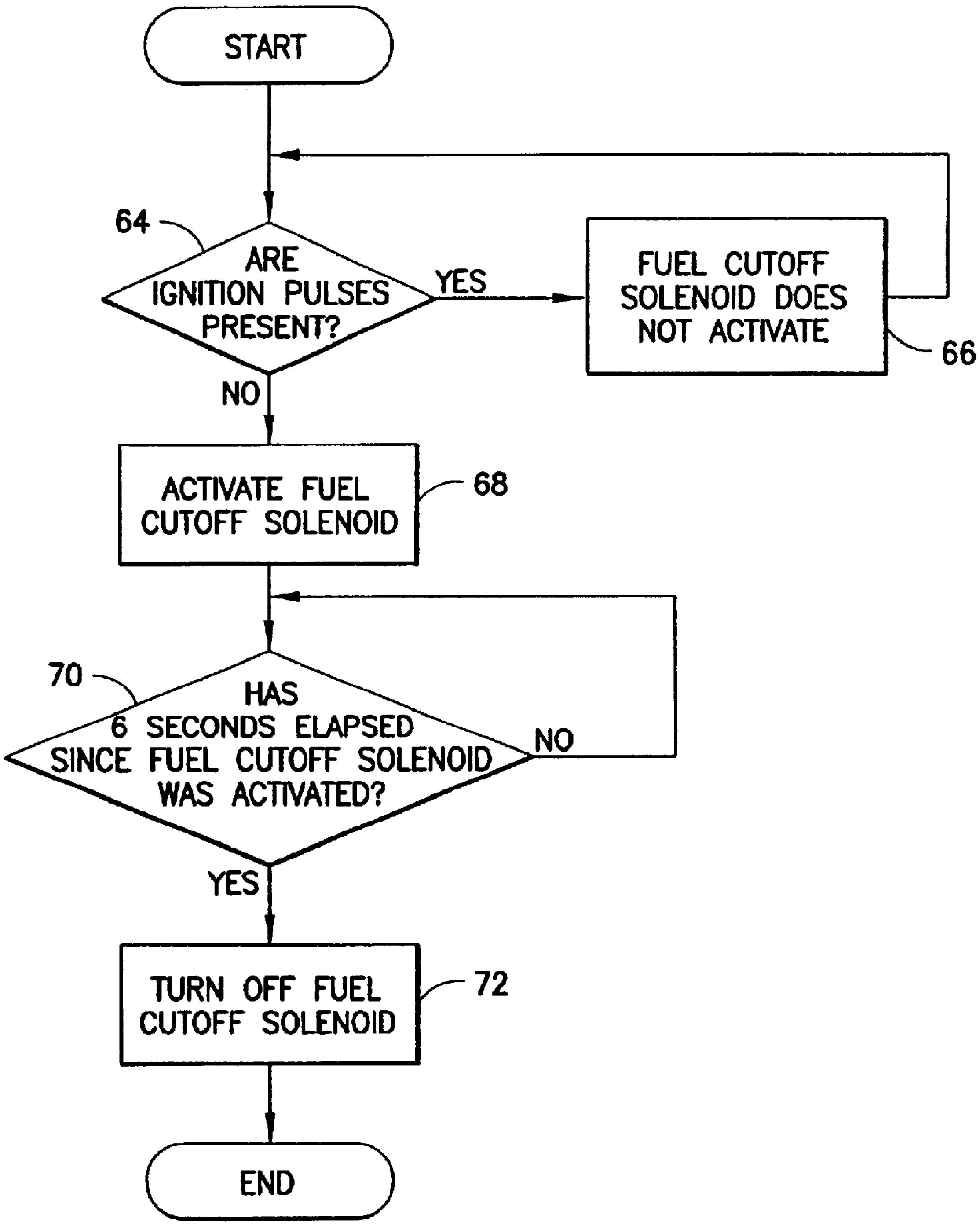
FIG. 3 is a flowchart showing steps of an algorithm performed by the fuel shutdown control system incorporated in the embodiment depicted in FIG. 2

The details of the algorithm performed by the fuel shutdown controller are presented in FIG. 3. After the engine has been started, the fuel shutdown controller monitors line 44 (see FIG. 2) for the presence of ignition pulses (step 64). If ignition pulses are present, then the fuel cutoff solenoid is not activated (block 66). If ignition pulses are absent, then the fuel cutoff solenoid is activated (step 68) by closing the relay 48 (see FIG. 2) to provide battery power to the solenoid. The fuel shutdown controller then monitors the time elapsed since the activation of the solenoid (step 70). The time elapsed is monitored continuously until 6 seconds have elapsed, at which point the fuel shutdown controller times out and releases the relay 48 to prevent discharge of the battery 54. As a result, the fuel cutoff solenoid is de-energized or turned off (step 72). The time interval of 6 seconds is adopted herein merely as an example. However, the time during which the fuel cutoff solenoid is energized must have a duration adequate to prevent muffler after-bang as the turned-off engine coasts to a halt. The IGBT 40 does not need to be bypassed for the electric-start embodiment.

Figure 4:
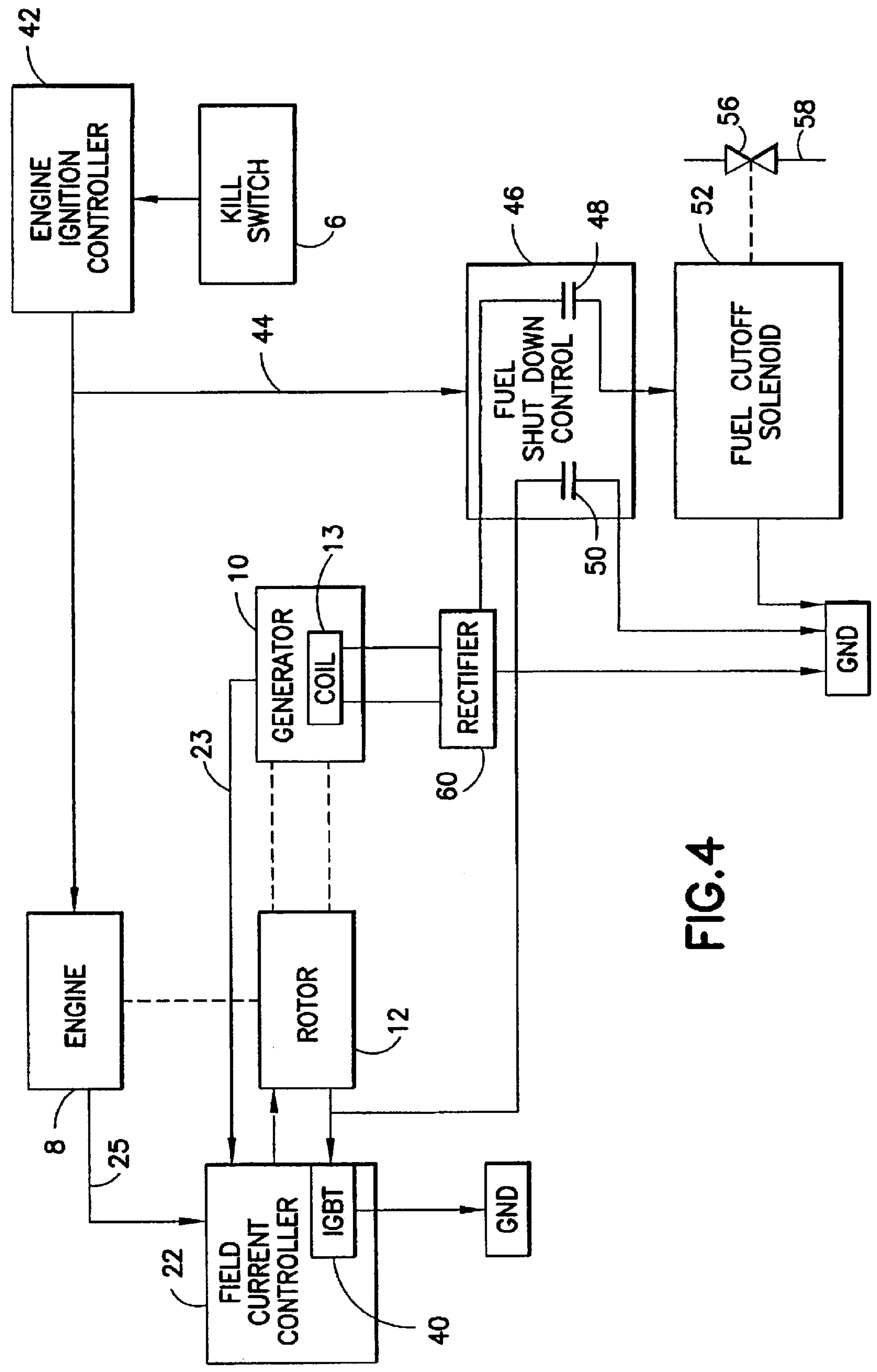
FIG. 4 is a block diagram showing portions of a pull-start (no battery) engine-driven generator system having a fuel shutdown control system in accordance with another embodiment of the present invention.

In contrast to the electric-start embodiment, the pull-start embodiment depicted in FIG. 4 has no battery to power the fuel cutoff solenoid 52. Instead the power to drive the fuel cutoff solenoid is derived from a stator winding or coil 13 in the generator 10. The coil 13, depicted in FIG. 4, is in addition to the stator windings 14, 15 and 16 (not shown in FIG. 4) previously described with reference to FIG. 1. The voltage from coil 13 is output to a rectifier 60, which converts the AC voltage to rectified DC that is sent to the fuel shutdown control block 46. In one embodiment, the rectifier 60 is a 15,000 i F capacitor.

As previously explained, the field current controller of the prior art is designed to turn off the generator 10 when the engine 8 is turned off, i.e., when the supply of power on line 25 from the lamp coil in the engine 8 is turned off. The field current controller 22 needs to turn off IGBT 40, which controls the current in the rotor winding, when the voltage on the gate of the IGBT falls below about 12 volts. This protects the IGBT from damage. However, when the generator turns off too quickly, there is not enough power to keep the fuel cutoff solenoid 52 energized. When the generator 10 shuts down to early, fuel is allowed back into the engine, which causes an after-bang in the muffler (not shown).

To overcome the foregoing shortage of power from the generator 10, in the embodiment depicted in FIG. 4 the fuel shutdown controller 46 senses when the kill switch 6 has been pressed (or when a start switch has been turned to the OFF position). This condition is detected in the same manner as previously described with reference to the embodiment shown in FIG. 2, namely, the fuel shutdown control circuit on board 46 monitors line 44 and detects when the output of ignition pulses ceases. When this state is detected, the fuel shutdown control circuit turns on, i.e., closes, a pair of relays 48 and 50 on board 46. The relay 48 connects the DC voltage output by the rectifier 60 to the fuel cutoff solenoid 52, while the other relay 50 connects the rotor winding to machine ground, which effectively bypasses the IGBT 40, letting the field in the rotor decay through its own resistance in the field. More precisely, when the IGBT is bypassed, the current to the rotor is not turned off and the full current from the exciter winding (item 15 in FIG. 1) is provided to the rotor, which in turn induces more current in the exciter winding. This decay process keeps the output from winding or coil 13 high as long as needed, which in turn keeps the fuel cutoff solenoid 52 engaged. Because the fuel cutoff valve 56 is held closed, fuel does not enter the muffler and the after-bang is eliminated. (The voltage applied to the fuel cutoff solenoid decays with the speed of the engine and only keeps the fuel cutoff valve closed above a certain minimum voltage.)

Figure 5:
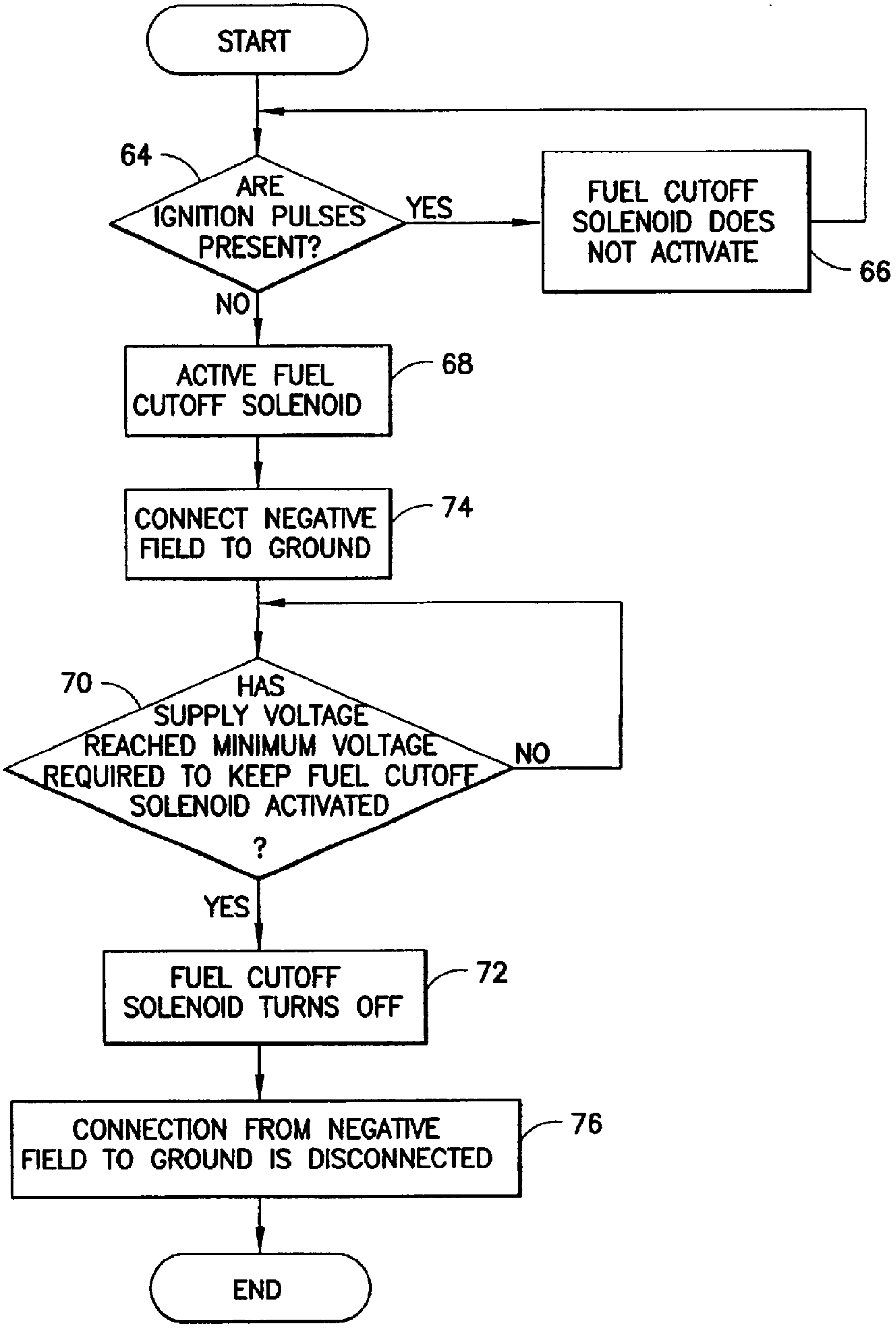
FIG. 5 is a flowchart showing steps of an algorithm performed by the fuel shutdown control system incorporated in the embodiment depicted in FIG. 4

The algorithm performed by the fuel shutdown control circuit for the embodiment depicted in FIG. 4 is shown in FIG. 5. After the engine has been started, the fuel shutdown controller 46 monitors line 44 for the presence of ignition pulses. If ignition pulses are present, then the fuel cutoff solenoid is not activated (block 66). If ignition pulses are not present, then the fuel cutoff solenoid is activated (step 68) by closing the relay 48 to provide power from the generator coil 13 (see FIG. 4). In addition, the negative field terminal of the rotor winding is connected to ground (step 74 in FIG. 5) by closure of relay 50 (see FIG. 4). Steps 68 and 74 can be performed either concurrently or in sequence. The fuel shutdown controller then monitors whether the supply voltage from the generator has yet decayed to the minimum voltage required to keep the fuel cutoff solenoid activated (step 70). After a period of time (in one case, approximately 6 seconds) that is a function of the voltage decay rate, the fuel shutdown controller times out and releases the relays 48 and 50, causing the fuel cutoff solenoid to turn off (step 72) and also causing the connection from the negative field terminal of the rotor winding to machine ground to be disconnected (step 76). These steps may be performed concurrently or in sequence. The actual time that the solenoid stays active depends on the decay time of the voltage from coil 13 supplied to it, which is dependent upon the rpm of the engine.

While the invention has been described with reference to preferred embodiments, it will be understood by those skilled in the art that various changes may be made and equivalents may be substituted for members thereof without departing from the scope of the invention. In addition, many modifications may be made to adapt a particular situation to the teachings of the invention without departing from the essential scope thereof. Therefore it is intended that the invention not be limited to the particular embodiment disclosed as the best mode contemplated for carrying out this invention, but that the invention will include all embodiments falling within the scope of the appended claims.

As used in the specification and claims, the term "winding" means one or more turns of wire forming a continuous coil or a fraction of a turn.

What is claimed is:

1. A method for cutting off the supply of fuel to an engine, comprising the following steps:

detecting whether ignition pulses are present; and activating a device for cutting off the supply of fuel to the engine in response to detection of a change from a first state in which ignition pulses are present to a second state in which ignition pulses are absent.

2. The method as recited in claim 1, further comprising the step of deactivating said device at a predetermined time subsequent to said activating step.

3. The method as recited in claim 1, wherein said activating step comprises the step of energizing a solenoid.

4. The method as recited in claim 3, wherein said step of energizing the solenoid comprises electrically connecting the solenoid to a battery power supply.

5. The method as recited in claim 3, wherein said step of energizing the solenoid comprises electrically connecting the solenoid to an output of a winding in a generator driven by the engine.

6. The method as recited in claim 5, further comprising the step of connecting a rotor winding of the generator to ground in response to detection that ignition pulses are not present, said winding connected to said solenoid being electromagnetically coupled to said rotor winding.

7. A system for cutting off the supply of fuel to an engine, comprising:

a battery power supply;

a first device that cuts off the supply of fuel to the engine when energized by said battery power supply and does not cut off the supply of fuel to the engine when not energized by said battery power supply;

a second device for connecting said first device to said battery power supply in a first state and disconnecting said first device from said battery power supply in a second state; and a control circuit that causes a change of state of said second device from said second state to said first state in response to a change from ignition pulses being present to ignition pulses being absent.

8. The system as recited in claim 7, wherein said first device comprises a solenoid.

9. The system as recited in claim 7, wherein said second device comprises a relay.

10. The system as recited in claim 7, wherein said control circuit has an input for receiving signals representing ignition pulses being sent to said engine.

11. A method for cutting off the supply of fuel to an engine being used to drive an electric generator, comprising the following steps:

detecting whether ignition pulses are present; and coupling a rotor winding of the generator to ground and a stator winding or coil of the generator to a fuel cutoff device in response to detection of cessation of ignition pulses.

12. The method as recited in claim 11, wherein said step of coupling the rotor winding to ground has the effect of shorting a power switch.

13. The method as recited in claim 11, further comprising the steps of opening said connections at a predetermined time subsequent to said coupling step.

14. The method as recited in claim 11, further comprising the step of rectifying said generator output, wherein said fuel cutoff device comprises a solenoid that is energized by the rectified generator output.

15. A power generation system comprising: an engine, an engine ignition controller for providing ignition pulses to said engine, a stator winding or coil for providing a generator output, a rotor winding driven to rotate by said engine, and a fuel shutdown system for cutting off the supply of fuel to said engine, wherein said fuel shutdown system comprises:

a first device that cuts off the supply of fuel to the engine when energized by said battery power supply and does not cut off the supply of fuel to the engine when not energized by said battery power supply;

a second device having first and second states, said rotor winding being connected to ground when said second device is in its first state and not connected to ground when said second device is in its second state;

a third device having first and second states, said stator winding or coil being coupled to said first device when said third device is in its first state and not coupled to said first device when said third device is in its second state; and a control circuit that causes a first change of state of said second device from its second state to its first state and a second change of state of said third device from its second state to its first state in response to cessation of ignition pulses.

16. The system as recited in claim 15, wherein said first device comprises a solenoid.

17. The system as recited in claim 15, wherein said second device comprises a first relay and said third device comprises a second relay.

18. The system as recited in claim 15, wherein said control circuit has an input for receiving signals representing ignition pulses being sent to said engine.

19. The system as recited in claim 15, further comprising a field current controller for supplying current to said rotor winding, said field current controller comprising a power switch that is shorted when said rotor winding is connected to ground.

20. The system as recited in claim 15, further comprising a rectifier for rectifying the output of said stator winding or coil.

21. A method for cutting off the supply of fuel to an engine being used to drive an electric generator, comprising the following steps:

detecting whether the engine has been turned off; and connecting an input of a fuel cutoff device to an output of a stator winding or coil of the generator in response to detection of engine turn-off, said fuel cutoff device being energized by said generator output.

22. The method as recited in claim 21, further comprising the step of connecting a rotor winding of the generator to ground in response to detection of engine turn-off.

23. The method as recited in claim 21, wherein a bipolar transistor is bypassed by grounding of the rotor winding.

24. The method as recited in claim 21, wherein said detecting step comprises the step of detecting whether ignition pulses are present.

* * * * *